United States Patent [19]

Katz et al.

[11] Patent Number: 5,109,404

[45] Date of Patent: * Apr. 28, 1992

[54] TELEPHONE CALL PROCESSOR WITH SELECT CALL ROUTING

[75] Inventors: Ronald A. Katz, Los Angeles, Calif.; Thomas D. Thompson, Papillion, Nebr.

[73] Assignee: First Data Resources, Inc., Omaha, Nebr.

[ * ] Notice: The portion of the term of this patent subsequent to Dec. 20, 2005 has been disclaimed.

[21] Appl. No.: 527,979

[22] Filed: May 24, 1990

Related U.S. Application Data

[63] Continuation-in-part of Ser. No. 335,923, Apr. 10, 1989, which is a continuation of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^5$ .................... H04M 3/36; H04M 3/50; H04Q 3/66
[52] U.S. Cl. .................... 379/88; 379/97; 379/113; 379/214; 379/265
[58] Field of Search .............. 379/88, 89, 67, 212, 379/214, 266, 97, 265, 113

[56] References Cited

U.S. PATENT DOCUMENTS

| | | | |
|---|---|---|---|
| 4,788,715 | 11/1988 | Lee | 379/84 |
| 4,792,968 | 12/1988 | Katz | 379/92 |
| 4,845,739 | 7/1989 | Katz | 379/92 |
| 4,893,328 | 1/1990 | Peacock | 379/67 |
| 4,896,345 | 1/1990 | Thorne | 379/67 |
| 4,972,461 | 11/1990 | Brown et al. | 379/67 |

OTHER PUBLICATIONS

"The AT&T Multimode Voice Systems-Full Spectrum Solutions for Speech Processing Applications", S. D. Hester et al., *Proc. of the 1985 AVIOS Conf.*, Sep. 1985, 12 pages.

"Conversant 1 Voice Systems: Architecture and Applications", R. J. Perdue et al., *AT&T Tech. Journal,* vol. 65, No. 5, Sep./Oct. 1986, pp. 34-47.

Primary Examiner—Thomas W. Brown
Attorney, Agent, or Firm—Nilsson, Robbins, Dalgarn, Berliner, Carson & Wurst

[57] ABSTRACT

A central processing system interfaces remote terminals through a dial-up telephone facility to complete various communication formats selectively involving either an audio response unit (ARU) or a telecommunications service representative station (TSR station). A substantial number of ARU's accommodate many calls simultaneously, executing formats whereby a caller is given voice cues or prompts to input digital data using the telephone keypad. Similarly, a substantial number of TSR stations accommodate calls in various formats with a prompting data display. Calls are selectively allocated to an ARU or a TSR station on the basis of time, call loads and call format. A programmable logic array cooperates with a host computer, load indicators and a clock (time class indicator) to implement a program of call allocation. Accordingly, the structure and process accommodate multiple-port, multiple-format operation.

20 Claims, 2 Drawing Sheets

TELEPHONE CALL PROCESSOR WITH SELECT CALL ROUTING

RELATED CASES

This is a continuation-in-part of an application Ser. No. 335,923 filed Apr. 10, 1989, and entitled "Telephonic-Interface Statistical Analysis System" which was a continuation of application Ser. No. 194,258 filed May 16, 1988, and entitled "Telephonic-Interface Statistical Analysis System", now U.S. Pat. No. 4,845,739 which is a continuation-in-part of application Ser. No. 018,244 filed Feb. 24, 1987, and entitled "Statistical Analysis System For Use With Public Communication Facility", now U.S. Pat. No. 4,792,968, which was a continuation-in-art of application Ser. No. 753,299 filed Jul. 10, 1985, and entitled "Statistical Analysis System For Use With Public Communication Facility", now abandoned.

BACKGROUND AND SUMMARY OF THE INVENTION

It has been proposed to interface persons at conventional telephones or other telephone-calling stations directly with a computer processing facility. Typically, in accordance with an audio-digital arrangement, recorded voice messages prompt callers to provide digital data by actuating the numeric buttons that are traditionally used for dialing the telephone. For example, a caller may actuate dialing buttons to attain a select communication channel or to address specific information in a computer. Another arrangement may involve a purchase of requested services or merchandise. Comprehensive systems accommodate several different programs or formats distinguished by different calling numbers. In spite of certain difficulties, such techniques have been widely adopted to expedite and enhance communication.

In relation to systems for interfacing a remote telephone caller with a computer, it has been proposed to provide a caller access to a live operator under certain circumstances. For example, such arrangements are described in U.S. Pat. No. 4,071,698, granted Jan. 31, 1978 to Barger, Jr. et al. Also, it has been proposed to answer calls when no operator is available and provide a processor interface, see U.S. Pat. No. 4,468,528 granted Aug. 28, 1984 to Reece et al. However, with respect to automated telephone interface systems utilizing live operators, the provision and scheduling of adequate operators have presented economic problems. Accordingly, a need exists for an improved system of allocating calls as with respect to live operator stations and automated processors.

In general, the present invention is based on a recognition of various criteria that can be effectively utilized for allocating calls in an interface system, specifically between processor apparatus (e.g. ARU's) and live operator stations. The call allocation process and structure of the present invention selectively routes calls to an interface processor or a live operator. For example, selection may be based on the priority of the call (format), current load conditions and/or the time of the call. The allocated call is provided along with prompting or reference data. Accordingly, calls are effectively executed by a multiple format data network.

In accordance with the system of the present invention, individual calls may be afforded different criteria for selective interface either with a processor or a live operator at a display terminal. For example, in one format, callers participating in a television game might be accorded high priority for a live operator during the broadcast of the program. However, during other times, the callers may be routinely interfaced with a processing unit. Also, calls may be allocated, as on a ratio basis, in accordance with current load factors on the live operator stations and/or the automatic processors. Accordingly, various patterns may be accommodated for the various formats treated by an interface system to more effectively accommodate individual allocation of calls, as between a computer interface and a live operator.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
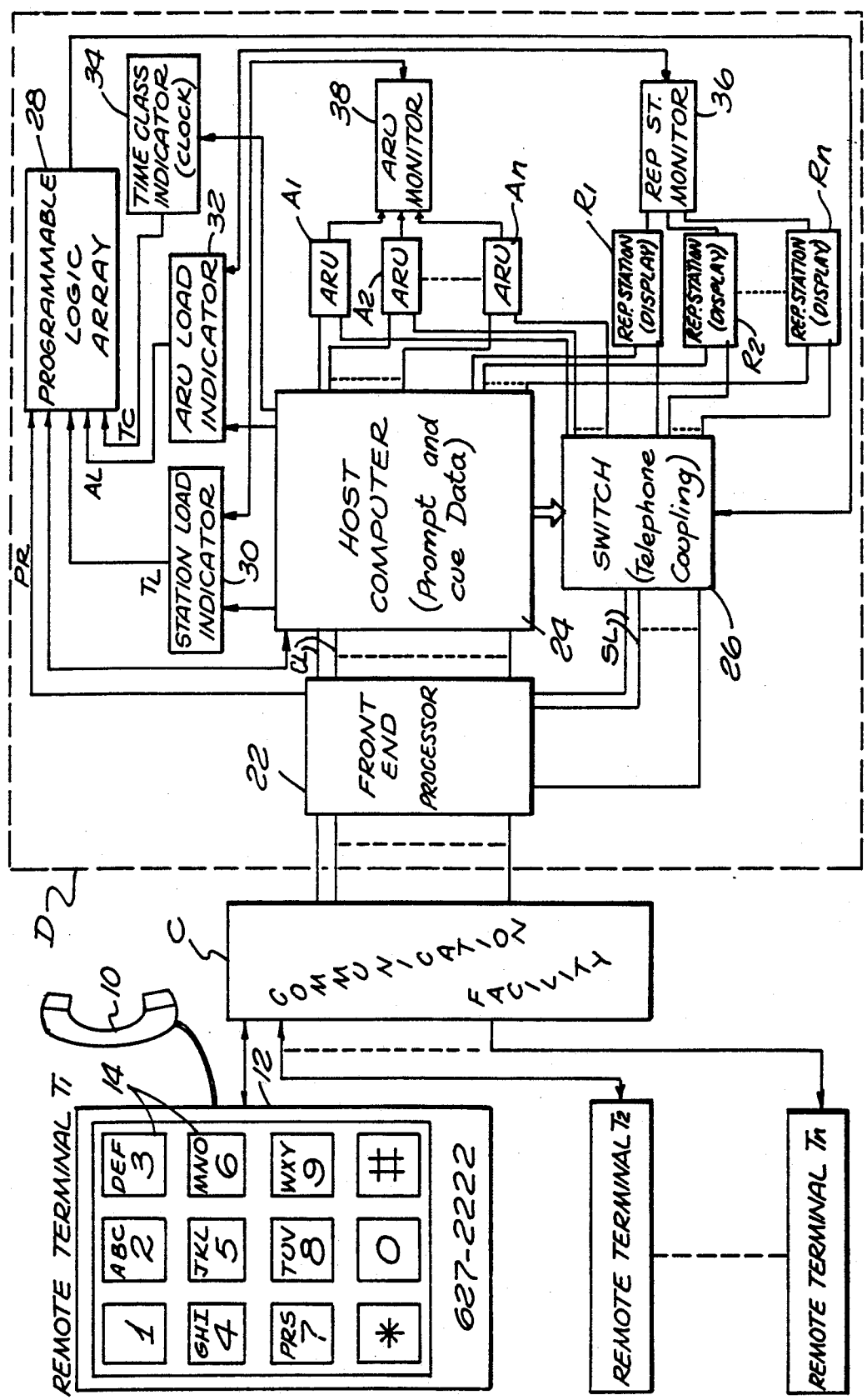
FIG. 1 is a block diagram of a system constructed in accordance with the present invention.

Referring initially to FIG. 1, a series of remote telephone instrument terminals T1-Tn are represented (left). The terminals are generally similar and, accordingly, only the terminal T1A1 is illustrated in detail.

In the disclosed embodiment, the terminals T1-Tn represent a multitude of conventional telephone terminals coupled to a dial-up communication facility C which may take the form of a comprehensive public telephone system. In accordance with the present system, the terminals T1-Tn operate through the communication facility C to be coupled with a central network D, an embodiment of which is illustrated in FIG. 1.

Generally, in accordance with the illustrative embodiment of FIG. 1, individual callers use the telephone terminals T1-Tn to interface a select format offered from the network D. For example, callers may be participating in a game format, an auction format, a lottery format, or may be pursuing an information format or ordering specific products or services according to a merchandising format.

Generally, the central network D accommodates callers by providing either an audio-digital computer processing interface or direct communication with a prompted live operator. However, at times, current load conditions may impose extreme demands on the capacity of the system. In that regard, the illustrative system as disclosed in FIG. 1 allocates calls (as between a processor and an operator) to facilitate practical scheduling with regard to equipment, formats, time, actual and anticipated call loads.

Considering the system of FIG. 1 in somewhat greater detail, an exemplary telephone terminal T1 is represented to include a handpiece 10 (microphone and earphone) and a panel 12 provided with a rectangular array of numeric push buttons 14 in the conventional configuration. The handpiece 10 accommodates the formation of analog voice signals while the panel 12 is a digital input apparatus.

Generally in accordance herewith, the handpiece 10 (earphone) serves to manifest voice signals from the network D to the caller while the panel 12 accommodates digital input by the caller. Of course, the buttons 14 of the panel 12 also are used cooperatively with the communication facility C to attain telephonic connection with the central network D (or other terminals).

Considering the central network D in somewhat greater detail, the communication facility C is coupled to interface a front end processor 22 along with a switch 26. The processor 22 is also connected to a host computer 24 (lines CL), a switch 26 (lines SL) and to provide signals to a programmable logic array 28 (lines PR). The front end processor 22 may take the form of various telephonic apparatus operating in cooperation with the switch 26 and the computer 24 to interconnect telephone lines selectively either to one of a plurality of audio response units (ARU's) A1-An or one of a plurality of representative stations R1-Rn. The audio response units A1-An may take the form of well known audio-digital structures of the prior art as may the telemarketing service representative stations R1-Rn comprising various forms of live operator terminals incorporating a display. While the switch 26 selectively provides the telephone link from the audio response units A1-An and the stations R1-Rn, the host computer supplies interface format data as appropriate. Specifically, if a call is coupled to a representative station, e.g. station R1, prompting data is supplied to the station R1 to facilitate the interface. For example, the station R1 might receive data to prompt an operator or telemarketing representative through a format transaction, e.g. a lottery or a game participation, a purchase, etc.

Alternatively, if a call is coupled to an audio response unit, e.g. unit A1, format data for an interface is supplied to the audio response unit A1. The selection between an audio response unit A1-An and a station R1-Rn is determined by the computer 24 in cooperation with the programmable logic array 28 in accordance with the principles of the present invention and as treated below. Generally, the system of the present invention is primarily related to the determination of the call destination, either to one of the audio response units A1-An for computer processing or to one of the stations T1-Tn for direct communication with a live operator. As disclosed in detail below, the destination may be determined based on the called format, the existing load conditions and the time of day.

In determining the connection, as between an audio response unit A1-An or station R1-Rn, the host computer 24 functions with the array 28 as well as other components which have been illustrated separately from the computer 24 for purposes of explanation. Specifically, the host computer 24 is connected to a station load indicator 30, an ARU load indicator 32 and a time class indicator 34. The indicators 30, 32 and 34 are in turn connected to the programmable logic array 28 which also has a control connection to the switch 26. The representative load indicator 30 also is connected to a representative station monitor 36 while the ARU load indicator is connected to an ARU monitor 38. The monitors 36 and 38 are connected to the units they monitor (ARU's and stations) and may take the form of registers to indicate the number of monitored units that are currently active, i.e. coupled to a caller. Functioning in association with the monitors 36 and 38, the indicators 32 and 30 respectively provide signals TL and AL indicative of the current loads. For example, the load signals may take the form of digital indications representing percentages of capacity load for the units A1-An and the stations R1-Rn.

The time class indicator 34 includes a clock (not shown) and may incorporate a look-up table. The indicator 34 simply indicates the priority code of a call in the form of a signal TC, as related for specific call formats during specific times of day. For example, calls seeking a particular format might be classified to have a high priority for direct personal contact with a representative between 2:00 PM and 3:00 PM. Accordingly, time code signals TC are derived. Indicative code signals TC specify the code as disclosed in detail below. Thus, the calling format (identified by a call) specifies a priority code that in turn specifies the conditions (e.g. relating to time and call load) for determining the call destination, either as a processor unit (A1-An) or a representative station (R1-Rn).

As stated above, the central network D accommodates calls directed to interface a multitude of different formats. As indicated above, callers may be seeking participation in: a game, a lottery, an auction, a merchandising scheme or they may be participating in a poll or simply seeking information.

Generally, each number called from one of the terminals T1-Tn to the front end processor 22 identifies a format, and accordingly a priority is specified. In that regard, telephone equipment designated DNIS (direct number identification system) may be utilized to provide signals to the processor 22 that indicate the called number through the so-called D channel. In any event, based on the called number, the front end processor 22 designates a specific format (lines CL) that is to be used for the processing of each individual call. Note that, if desirable, the front end processor 22 may incorporate audio capability for a preliminary interface with callers.

In a substantial system, the front end processor 22 is capable of processing a multitude of individual calls. Accordingly, the processor 22 functions in cooperation with the host computer 24 to determine the destination (format) for each call, initially either a processor unit (A1-An) or a station (R1-Rn). Once such a determination has been made, the host computer supplies associated format data to the destination and the switch 26 is actuated to establish the determined connection. The format data for a unit A1-An may be an implementing program. For the stations R1-Rn, the format data may drive a display to prompt an operator.

In implementing the system of FIG. 1, a considerable number of audio response units (A1-An) and representative stations (R1-Rn) may be provided. That is, the system may have the capability to accommodate thousands of calls simultaneously. Nevertheless, under peak load conditions the demand still may exceed the capability of the system to provide either operator or processor interfaces, or both.

To consider interface formats in greater detail, one class of format may specify interfaces exclusively with audio response units, specifically one of the units A1-An. In pursuing such a format, if all of the units A1–An are busy, the caller is not accommodated. Of course, various techniques might be used for such situations, as forming a waiting queue, informing callers of the condition or simply perpetuating the "ring" signal suggesting no "answer" at the called terminal.

To consider another example, callers pursuing a format specifying a preference for a live operator also may exceed the capacity of the system. However, in accordance herewith, under appropriate conditions excess callers might be switched to a processor interface involving an automatic response unit (A1–An). As disclosed in detail below, the system affords flexible priority scheduling as related to formats, load conditions and time to combat call overloads.

In view of the above preliminary considerations and descriptions, the system of FIG. 1 now may best be understood and appreciated by assuming certain conditions and explaining the resulting operations with reference to FIG. 1. Preliminarily, assume a caller at the remote terminal T1 desirous of an interface with the central network D in a format limited to computer processing. For example, the caller may be seeking information, participating in a poll or pursuing various other formats necessitating a computer interface.

The caller actuates the remote terminal T1 using the buttons 14 to provide signals routing the call through the communication facility C to the front end processor 22 at the central network D. Signals representative of the called number also are received by the processor 22 to indicate that the call is for a format to be processed by an ARU. Accordingly, the host computer 24 selects an available audio response unit (from the units A1–An), supplies format data to the selected unit and actuates the switch 26 to provide an audio-digital connection from the front end processor 22 to the selected unit. Although the operation is somewhat in accord with prior systems, now consider operations involving calls for formats selectively involving a live operator or representative at a station R1–Rn. In accordance herewith, such formats are assigned priority codes stored in the front end processor 22. For example, a few representative format priority codes are set forth below to illustrate various possibilities.

| Format Priority Codes | Process |
| --- | --- |
| P1 | During time class T3, transfer to a telemarketing representative station unless all stations are busy and involve a wait over five seconds; at other times process by audio response unit or default. |
| P2 | If representative stations are under 70% loaded, transfer to station; otherwise allocate calls 50% to stations, 50% to an audio response unit, or default. |
| P3 | If representative stations are under 65% loaded, transfer to station; otherwise, if audio response units are under 90% loaded, to audio response unit, otherwise default. |

Essentially as represented, format priority codes specify the treatment accorded calls depending on factors as time and load. Considering the above examples, a priority code P1 might be employed for calls in a format with a high priority for a live representative during certain times, however, suitable for processing by an audio response unit during other times. For example, a priority code P1 might be used for callers participating in a television game show. Specifically, the callers might be accorded a very high priority for a live operator during the show, or during a predetermined period of time after the show; otherwise, the callers would be adequately served by an audio response unit (A1–An).

The priority code P2 might be used for a format to accord callers a relatively high priority for a live operator, unless or until the load on live operators approaches a critical threshold. The priority code P2 might be appropriate for a merchandising format.

The priority code P3 illustrates another range of possibilities involving consideration of the load on live operators as well as the load on the audio response units. For example, a situation may arise in which the audio response units A1–An are more heavily loaded than the service representative stations R1–Rn.

The priority codes may be defined, recognizing economic considerations, the possibility of an overload to the extent that calls may not be accepted. Thus, various techniques may be employed to accommodate various objectives.

To pursue further exemplary operations of the system of FIG. 1, again assume a caller at the remote terminal T1 desiring to participate in a format at the network D. As previously, the caller actuates the remote terminal T1 and is connected to the front end processor 22. The processor receives indications representative of the called number. Accordingly, as by use of a look-up table, the processor 22 provides a priority code signal PR to the programmable logic array 28.

Figure 2:
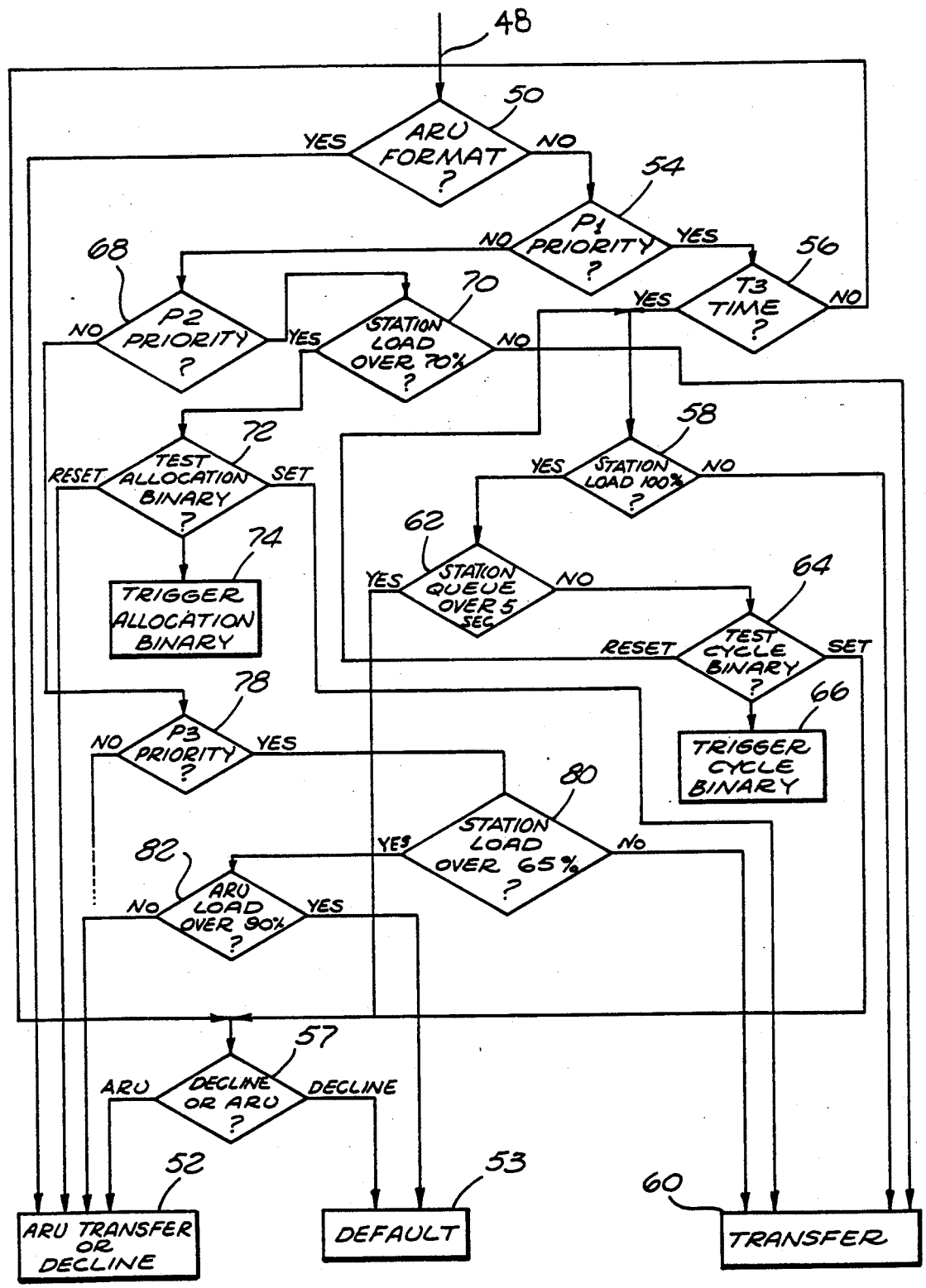
FIG. 2 is a flow diagram illustrating operating formats as implemented by the system of FIG. 1.

Referring to FIG. 2, from the starting line 48, the operational step of determining the format and the resulting implications is indicated by the query block 50 in FIG. 2. If the format is limited to an audio response unit, as explained above, the system proceeds to block 52 (lower left) indicating the appropriate step of transferring the call to an audio response unit. Of course, if no unit is available, the call will be declined as indicated above.

If the assumed format involves the possibility of a live operator interface (stations R1–Rn), the process moves from the block 50 to a query block 54 initially to resolve whether or not the priority code P is indicated. If so, the next step involves a determination related to the current time of day. Responsive to the operation, in the structure of FIG. 1, the time class indicator 34 supplies signals TC indicative of the time class. For example, time class TC3 might designate a one-hour interval from 2:00 PM to 3:00 PM. Accordingly, the logic array 28 receives the signal TC along with signals TL (representative station load indicator) and AL (ARU load indicator). The array 28 then proceeds in accordance with the process as detailed in FIG. 2.

If the current time is not the critical time of class T3 (related to priority code P1), a negative determination is indicated from the query block 56 with the consequence that the call is tested for transfer to one of the audio response units A1–An as indicated by the block 52. An interim test is indicated by a query block 57 that might involve the load on the units A1–An.

If the call is to be transferred to one of the units A1–An, the programmable logic array 28 actuates the switch 26 along with the host computer 24 prompting a telephonic connection from the front end 22 through P1 the switch 26 to an available audio response unit. Concurrently, the host computer 24 provides prompting data to accommodate the selected format operation at the selected audio response unit (A1-An).

If the call under consideration occurs during the time of the classification T3, the process proceeds from the query block 56 to a query block 58 for a determination of the current load on the live operators. If the stations R1-Rn are not all active (load under 100%) as indicated by the station load indicator 30, the call is transferred to an available station as indicated by the block 60 (FIG. 2, lower right). Relating the transfer to the structure of FIG. 1, with the determination of an available station, the logic array 28 actuates the switch 26 to couple the caller to an available one of the stations R1-Rn. Concurrently, the host computer 24 is actuated by the logic array to provide a prompting format to the selected station for display.

Returning to the process as illustrated in FIG. 2, if all live-operator stations R1-Rn are busy, the process proceeds from the query block 58 to a query block 62 for a determination of the length of the queue for a live operator. Essentially, if the queue indicates the likely availability of an operator within five seconds, the call may be cycled. Alternatively, termination procedures are instituted as described at a later stage below.

The cycling operation involves advancing from the query block 62 to a query block 64 for testing whether or not the call has been previously cycled. If so, the process proceeds to determine whether the call should be declined or transferred to an audio response unit (A1-An). The determination is represented by the block 57 (lower left).

If there was not a previous cycle, the process returns to the step represented by the block 58 as indicated to again test the instant load on the live operators. Note that with the cycling operation, a binary 66 is set or reset (in the logic array 28) as indicated by the block 66. Thus, the logic involves a single cycle operation as may be performed in association with a queuing register.

Summarizing with respect to a call for a format having a priority code P1, the process is in accordance with the steps of the process as illustrated in FIG. 2 treated above. Specifically, the programmable logic array 28 and the host computer determine the resolution of a call, for transfer to an audio response unit (block 52), for transfer to a TSR (block 60) or for default (block 53).

To consider the operation in relation to an alternative priority code, assume the caller at the terminal T1 seeks a format with a priority code P2. In that event, the front end processor 22 provides a signal PR indicating priority P2 with the operating consequence that the query block 54 (FIG. 2) rejects the call advancing the process to a query block 68 testing for the priority code P2. As a result, the process proceeds as will now be described. With the recognition of the priority P2, the logic array 25 tests the current load on stations R1-Rn, as indicated by a signal TL from the indicator 30. The step is illustrated in FIG. 2 by the query block 70. If the load on the stations R1-Rn is under 70%, the array 28 (FIG. 1) commands transfer of the call to a select one of the stations. As indicated above, the switch 26 is actuated to accomplish a telephonic coupling, and the host computer 24 is actuated to transfer format prompting data for display at the select station. The step is illustrated by the block 60 (FIG. 2, lower right).

In the illustrative example, if the instant load on the stations R1-Rn is over 70%, the logic array 28 allocates calls on a 50—50 basis between audio response units A1-An and operator stations R1-Rn. Specifically, an allocation binary (not shown) is provided in the array 28 to alternately accomplish the transfer. The step of testing the allocation binary is illustrated in FIG. 2 by a block 72. If the allocation binary is set, the call is transferred to a station (R1-Rn). Conversely, the call is transferred to an audio response unit (A1-An) if the binary is reset. In either event, as indicated by the block 74, the allocation binary is triggered to the opposed state. Consequently, calls are alternately connected to an automatic response unit and a representative terminal.

To consider the third exemplary format priority code, assume a caller at the remote terminal T1 seeks a format with the priority code P3. As indicated above, the priority code P3 accesses a live operator unless the operators are at least 65% loaded to capacity. If the load threshold is exceeded, calls interface an audio response unit unless such units are at over 90% of load capacity. If that threshold is exceeded, calls are declined (defaulted).

With respect to the above phase of the process, as explained above, the caller actuates the remote telephone terminal T1 to establish communication through the facility C with the front end processor 22. In this instance, the calling number provided to the processor 22 also indicates a specific operating format and consequently a priority code. The front end processor 22 supplies signals PR (indicating the priority P3) to the programmable logic array 28. Additionally, the host computer 24 is actuated to implement the attendant process steps.

A call seeking a format with a priority P3 is recognized by the test of the query block 78 (FIG. 2, left central). Proceeding from an affirmative determination, as indicated by the block 78, the programmable logic array 28 (FIG. 1) tests the representative station load (signal TL) as indicated by the query block 80 (FIG. 2). If the load is under 65% of capacity, the process proceeds with the host computer 24 coupling the caller through the switch 26 to a select station (R1-Rn) and supplying prompt data for display. Conversely, if the load is over 65% of capacity, the process proceeds to a secondary step with the array 28 testing the ARU load (signal TC). Specifically, as indicated by the query block 82 (FIG. 2) the array 28 determines whether or not the ARU load is in excess of 90% of capacity.

If the ARU load exceeds 90% of capacity, the array 28 actuates the host computer to default the call as indicated by the block 53. Conversely, if the ARU load is below 90%, the call is assigned to a select one of the audio response units A1-An as indicated by the block 52. Additionally, as indicated above, the host computer 24 provides format data to the operative audio response unit.

In practical systems hereof, many formats may be accommodated with a wide variety of priority codes. In that regard, proceeding from the query block 78 in FIG. 2, numerous priority codes may be identified and tested. Typically in a sizable system, the identification of priority codes would not be a serial operation, but would involve a look-up table (not shown) in the processor 22.

In view of the above exemplary formats specifying priority codes, it will be appreciated that various criteria can be utilized to accommodate a multitude of different possibilities so as to effectively schedule and allot traffic between live operators at work stations and audio response units. In the disclosed embodiment, allocations involve assigned priorities, load factors and time; however, it will be appreciated that various other factors and phenomena may be utilized in accordance with the teachings hereof.

Accordingly, while certain exemplary processes have been described herein and certain detailed structures have been disclosed, the appropriate scope hereof is deemed to be appropriately resolved in accordance with the claims as set forth below.

What is claimed is:

1. A call allocation system for use with a multiple format data network including computer means operative with audio-digital processors and attended stations to interface callers ar remote terminals with said audio-digital processors and said attended stations through a dial-up telephone facility, said call allocation system comprising:
   front-end means for receiving telephone calls from said remote terminals and including means to provide format signals indicative of call allocations;
   load indicator means for indicating current loads of calls from said remote terminals to said audio-digital processors and to said attended stations;
   switch means for selectively coupling fresh incoming calls form said remote terminals to an audio-digital processor or an attended station; and
   logic means for controlling said switch means in accordance with said format signals and said load indicator means.

2. A system according to claim 1 further including means for selectively coupling said computer means to supply format data to one of said audio-digital processors or one of said attended stations.

3. A system according to claim 1 wherein said load indicator means include means for providing station load signals to indicate the call load with respect to said attended stations.

4. A system according to claim 1 wherein said load indicator means include means for providing processor load signals to indicate the call load with respect to said audio-digital processors.

5. A system according to claim 1 wherein said load indicator means include means for providing station load signals to indicate the call load with respect to said attended stations and processor load signals to indicate the call load with respect to said audio-digital processors.

6. A system according to claim 1 further including time indicator means and wherein said logic means is coupled to said time indicator means to further control said switch means accordingly.

7. A system according to claim 6 further including means for selectively coupling said computer means to supply format data to said audio-digital processors and attended stations.

8. A system according to claim 7 wherein said load indicator means include means for providing station load signals to indicate the call load with respect to said attended stations.

9. A system according to claim 7 wherein said load indicator means include means for providing processor load signals to indicate the call load with respect to said audio-digital processors.

10. A system according to claim 6 wherein said load indicator means include means for providing station load signals to indicate the call load with respect to said attended stations and processor load signals to indicate the call load with respect to said audio-digital processors.

11. A system according to claim 1 wherein said logic means further includes program means for establishing call allocation patterns in accordance with formats of the calls.

12. A system according to claim 11 wherein said program means allocates calls between said audio-digital processors and said attended stations on a ratio basis.

13. A system according to claim 11 wherein said load indicator means include means for providing station load signals to indicate the call load with respect to said attended stations and processor load signals to indicate the call load with respect to said audio-digital processors.

14. A telephone call processor system to interface callers at remote terminals for communication through a dial-up telephone facility, said processor system comprising:
   a plurality of audio-response units for interfacing calls from said remote terminals with audio-digital communication according to at least one predetermined format;
   a plurality of attended telecommunications stations to afford live operator interface for calls from said remote terminals;
   load indicator means for indicating current loads of calls from said remote terminals to said audio-response units and to said attended stations;
   switch means for selectively coupling fresh incoming calls from said remote terminals to one of said audio response units or one of said attended stations; and
   logic means for controlling said switch means in accordance with said load indicator means.

15. A system according to claim 14 further including computer means for supplying format data to said audio-digital units and said attended telecommunications stations.

16. A system according to claim 15 further including means to receive called format signals from said remote terminals and wherein said logic means further controls said switch means in accordance with said format signals.

17. A system according to claim 16 wherein said load indicator means include means for providing station load signals to indicate the call load with respect to said attended stations.

18. A call allocation process for allocating calls to a multiple format data network including computer means operative with audio-digital processors and attended stations to interface callers at remote terminals with said audio-digital processors and said attended stations through a dial-up telephone facility, said call allocation process comprising:
   receiving telephone calls from said remote terminals and formulating format signals indicative of a specific format sought by each of said callers;
   sensing the call loads on said audio-digital processors and on said attended stations to provide call load signals; and
   selectively allocating calls to one of said processors or one of said stations in accordance with said format signals and said call load signals.

19. A process according to claim 18 further including a step of allocating calls with respect to time.

20. A process according to claim 18 further including a step of providing format control signals to said audio-digital processors and attended stations in accordance with said step of allocating calls.

* * * * *

UNITED STATES PATENT AND TRADEMARK OFFICE
CERTIFICATE OF CORRECTION

PATENT NO.   : 5,109,404
DATED        : April 28, 1992
INVENTOR(S)  : Ronald A. Katz It is certified that error appears in the above-identified patent and that said Letters Patent is hereby corrected as shown below:

Column 1, lines 15-16, delete "continuation-in-art" and add -- continuation-in-part --;

Column 2, line 41, after "terminal T1" delete "A1";

Column 6, line 66, after "through" delete "P1";

Column 9, line 24, delete "form" and add -- from --; and

Column 10, lines 35-36, delete "audio-digital" and add -- audio-response --.

Signed and Sealed this

Thirteenth Day of July, 1993

Attest:

MICHAEL K. KIRK

*Attesting Officer*      Acting Commissioner of Patents and Trademarks